(12) United States Patent
Barzen

(10) Patent No.: US 12,606,102 B2
(45) Date of Patent: Apr. 21, 2026

(54) DEVICE MOUNTING SYSTEM FOR CAB

(71) Applicant: AGCO International GmbH,
Neuhausen (CH)

(72) Inventor: Alexander Barzen, Marktoberdorf (DE)

(73) Assignee: AGCO International GmbH,
Neuhausen (CH)

( * ) Notice: Subject to any disclaimer, the term of this
patent is extended or adjusted under 35
U.S.C. 154(b) by 159 days.

(21) Appl. No.: 18/497,160

(22) Filed: Oct. 30, 2023

(65) Prior Publication Data

US 2024/0198921 A1 Jun. 20, 2024

(30) Foreign Application Priority Data

Dec. 15, 2022 (GB) ...................................... 2218911

(51) Int. Cl.
*B60R 11/02* (2006.01)
*B60R 11/00* (2006.01)

(52) U.S. Cl.
CPC ... *B60R 11/0229* (2013.01); *B60R 2011/0003*
(2013.01); *B60R 2011/0087* (2013.01)

(58) Field of Classification Search
CPC ............. B60R 11/0229; B60R 11/0235; B60R
2011/0003; B60R 2011/0022; B60R
2011/0028; B60R 2011/0084; B60R
2011/0085; B60R 2011/0087; B62D
33/0617
USPC ........................................................ 348/837
See application file for complete search history.

(56) References Cited

U.S. PATENT DOCUMENTS

| | | |
|---|---|---|
| 6,669,260 B2 | 12/2003 | Clark et al. |
| 8,087,623 B2 | 1/2012 | Suddarth |

| | | | |
|---|---|---|---|
| 9,950,677 B2 | 4/2018 | Poliquin | |
| 2014/0246468 A1* | 9/2014 | Montgomery | B60K 35/60 |
| | | | 224/548 |
| 2015/0138449 A1* | 5/2015 | Rawlinson | B60K 35/28 |
| | | | 348/837 |
| 2016/0096488 A1* | 4/2016 | Poliquin | G03B 17/561 |
| | | | 348/148 |
| 2016/0186410 A1* | 6/2016 | Shioji | B60R 11/0235 |
| | | | 296/190.1 |
| 2018/0178648 A1 | 6/2018 | Waco et al. | |
| 2020/0183165 A1* | 6/2020 | Hartwig | G02B 27/0101 |

FOREIGN PATENT DOCUMENTS

| | | | | |
|---|---|---|---|---|
| DE | 202020104447 U1 | 10/2020 | | |
| EP | 3812214 A1 * | 4/2021 | ............. | B60R 11/00 |

OTHER PUBLICATIONS

European Patent Office, Search Report related to EP23203281.3,
mail date Mar. 21, 2024, 7 pages.
UK Intellectual Property Office, Search report for related UK
Application No. GB2218911.2, dated May 18, 2023, 3 pages.

* cited by examiner

*Primary Examiner* — Kathleen M Walsh

(57) ABSTRACT

A system for mounting a device such as a display device
(e.g., a monitor) inside a cab of a utility vehicle having
generally vertically extending pillars supporting a cab roof
structure. The system has one or more first support elements
designed to extend generally horizontally between two pil-
lars and one or more second support elements designed to
extend generally vertically from the roof structure to support
the first element or elements in position between the pillars.
Attachment mechanisms are carried on one or more of the
support elements for supporting one or more display devices
or other devices.

20 Claims, 3 Drawing Sheets

DEVICE MOUNTING SYSTEM FOR CAB

CROSS-REFERENCE TO RELATED APPLICATIONS

This application claims the benefit of the filing date of U. K. Patent Application 2218911.2, "Device Mounting System for Cab," filed Dec. 15, 2022, the entire disclosure of which is incorporated herein by reference.

FIELD

Embodiments of the present disclosure relate generally to a mounting system for a device inside a cab of a utility vehicle. The invention relates in particular, but not exclusively, to a mounting system for mounting a display device (e.g., a monitor) or other device in the cab of a utility vehicle such as an agricultural tractor or similar vehicle.

BACKGROUND

Known device mounting systems are not very flexible as to where the device can be mounted, and tend to provide adjustment of the position of the device along fixed horizontal and/or vertical axes.

It is an object of the present invention to provide a mounting system which overcomes the above difficulty by providing a system with improved flexibility as to where the device can be mounted.

BRIEF SUMMARY

Certain embodiments include a mounting system for mounting a device inside a cab of a utility vehicle, where the cab has a plurality of generally vertically extending pillars supporting a cab roof structure. The mounting system has at least one first support element configured to extend between, and be coupled to, two of the pillars and at least one second support element configured to extend from the roof structure and be coupled to the at least one first element so as to support the at least one first element in position between the pillars. An attachment apparatus carried on at least one of the support elements is configured for supporting a device.

Such a mounting system provides a great deal of freedom in the positioning of the mounted device as the attachment apparatus can be mounted at a variety of positions along the support elements, whose positions can also be varied both horizontally and vertically through a wide range of locations between the pillars. Also, more than one device can be mounted on the support elements. The pillars may be located in corners of the cab, and may be referred to as corner posts.

The attachment apparatus may be removably and/or adjustably mountable to at least one of the support elements. The attachment apparatus may include a mount to which the device can be fitted. The mount may be configured to mount a specific type of device or a range of different types of device.

The device mounted using the system may be a display device.

There is an increasing need to provide display devices in utility vehicle cabs and it is desirable to enable an operator to have as much freedom as possible in positioning a display device where it can be easily seen without obscuring the operator's field of vision. This is a particular requirement for utility vehicles such as agricultural tractors and construction vehicles where an operator may have to change their position and/or orientation within the cab to carry out a range of tasks. In such vehicles, the operator generally has a seat that can be rotated away from a straight-ahead driving position when required to carry out certain tasks.

There may be a single first support element extending between two of the pillars and a single second support element extending between the roof structure and the first support element. The first support element may extend generally horizontally between the pillars, although it can be inclined to the horizontal to at least some extent. The second support element may extend generally vertically down from the roof structure to be coupled to the first support element at a position between the ends of the first support element. The ends of the first support element may be adjustably mountable along the length of their respective pillars. The first support element may be adjustable in length and may be telescopic. An upper end of the second support element may be adjustably mountable to the roof structure in a direction between the pillars to which the first support element is mounted. A lower end of the second support element may be adjustably mountable along the length of the first support element. The second support element may be adjustable in length and may be telescopic.

Ends of the first and second support elements may be provided with fasteners for securing the ends of the support elements to one of the pillars, the roof structure, and another support element as appropriate.

The fasteners at the ends of the first support element may each be configured to attach an end of the first support element to a respective one of the pillars. Each pillar may have a sliding track extending in a lengthwise direction of the pillar. The sliding track may be integral with the pillar or mounted thereto. The fasteners on the first support element may engage the sliding tracks such that the positions of the ends of the first support element can be adjusted along the length of the pillars by sliding the attachment mechanisms along track and fixing in position, such as by a clamping arrangement.

The fasteners at the ends of the second support element may include an upper fastener configured to be attached to the roof structure. The roof structure may include a sliding track extending in a direction between the pillars to which the first support element is mounted. In this embodiment, the sliding track may be formed as an integral part of the roof structure or be mounted thereto. The upper fastener may engage with the sliding track so that the position of the upper end of the second support element can be adjusted between the pillars. A lower fastener may be provided at the other end of the second support element and configured to be mounted to the first support element. The first support element may define a sliding track, or a sliding track may be attached to the first support element, and the lower fastener mounted to the sliding track so that the position of the lower end of the second support element can be adjusted along the length of the first support element. Alternatively, the lower fastener may be provided on the first support element and the lower end of the second support element configured for attachment to the lower fastening element. The position of the lower fastening element may be adjustable along the length of the first support element.

At least one of the fasteners may include a pivot to allow the angle of the respective support element to relative to the component to which they are secured to be varied.

At least one fastener on the at least one first support element may directly engage an inwardly facing surface on an associated pillar or a track mounted thereon.

A fastener on an upper end of the at least one second support element may engage a downwardly facing surface on the roof structure or a track mounted thereon.

A fastener on a lower end of the at least one second support element may engage the at least one first support element or a track mounted thereon.

At least one fastener may comprise a main body which engages an associated track on a pillar, roof structure, or connected support element; a first clamping system for clamping the main body to the associated track in a required operating position; an arm mounted for pivoting about a first axis on the main body and secured to an end of its associated support element; and a second clamping system for clamping the arm in a set pivoted position about the first axis relative to the main body. The arm may be mounted on the main body of the fastener via a domed swivel plate which slides over and is configured to be clamped against a similarly domed portion of the main body by the second clamping system to provide further freedom of movement of the arm relative to the main body. The arm may have a slot through which the fastener is attached to its associated support element, thus allowing the effective length of the associated support element to be varied. The slot enables the combined length of the associated support element and the fastener to be varied. The arm may be able to pivot relative to the main body about a second axis perpendicular to the first axis.

At least one fastener may comprise clamping screws which engage threaded apertures in an associated pillar or the roof structure.

In some embodiments, a utility vehicle has an operator's cab with a plurality of generally vertically extending pillars supporting a cab roof structure and a mounting system as described herein.

The first support element may be elongate having opposed ends, each end of the first support element may be mounted to a respective one of the pillars to allow the position of the end of the first support element to be adjusted in a lengthwise direction of the pillar.

The second support element may be elongate having opposed ends. An uppermost end of the second support element may be mounted to an elongate member of the roof structure extending generally in a direction between the pillars to which the first support element is mounted. The connection between the upper end and the elongate member may be configured to allow the position the upper end to be adjusted in a lengthwise direction of the elongate member. A lower end of the second support element may be attached to the first support element. The connection between the lower end and the first support element may be configured to allow the position the lower end to be adjusted in a lengthwise direction of the first support element.

At least one of the first and second support elements may be adjustable in length.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which:

4

Figure 1:
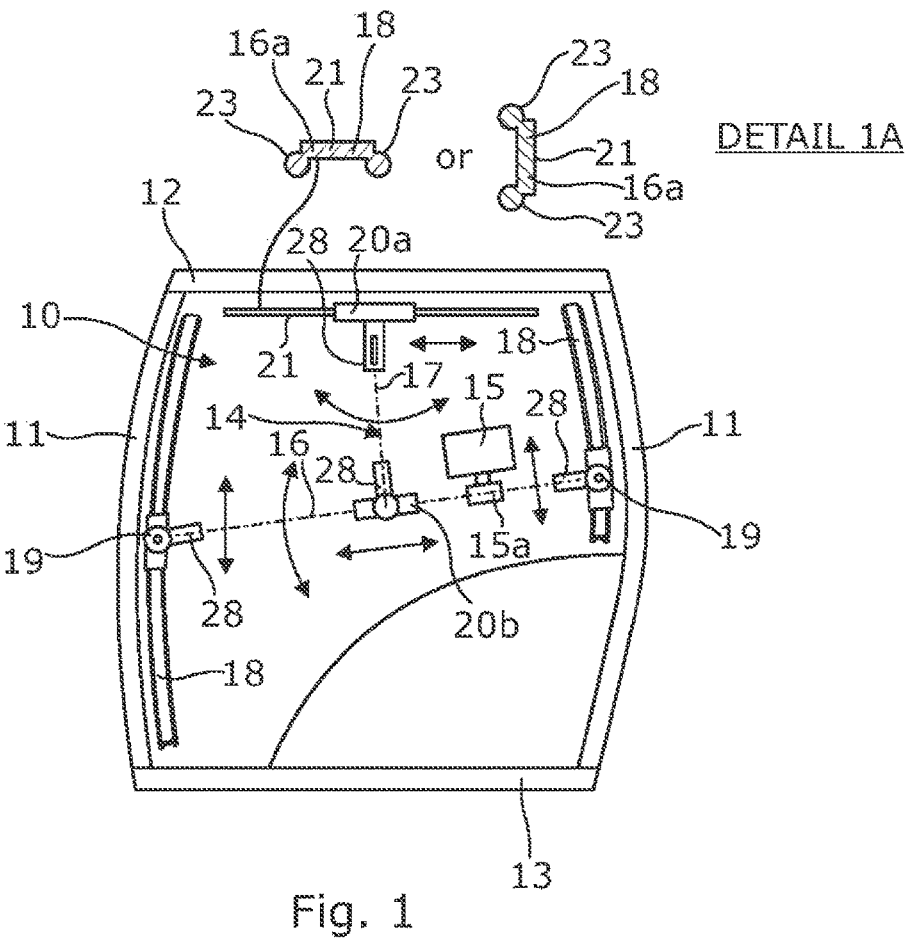
Figure 2:
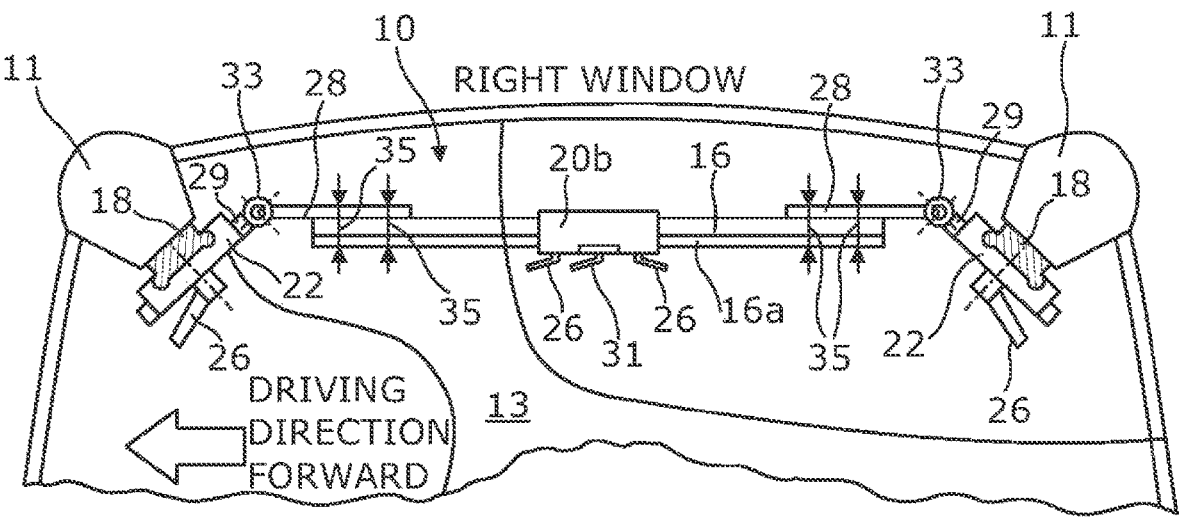
Figures 3, 4, 5, 6, 7:
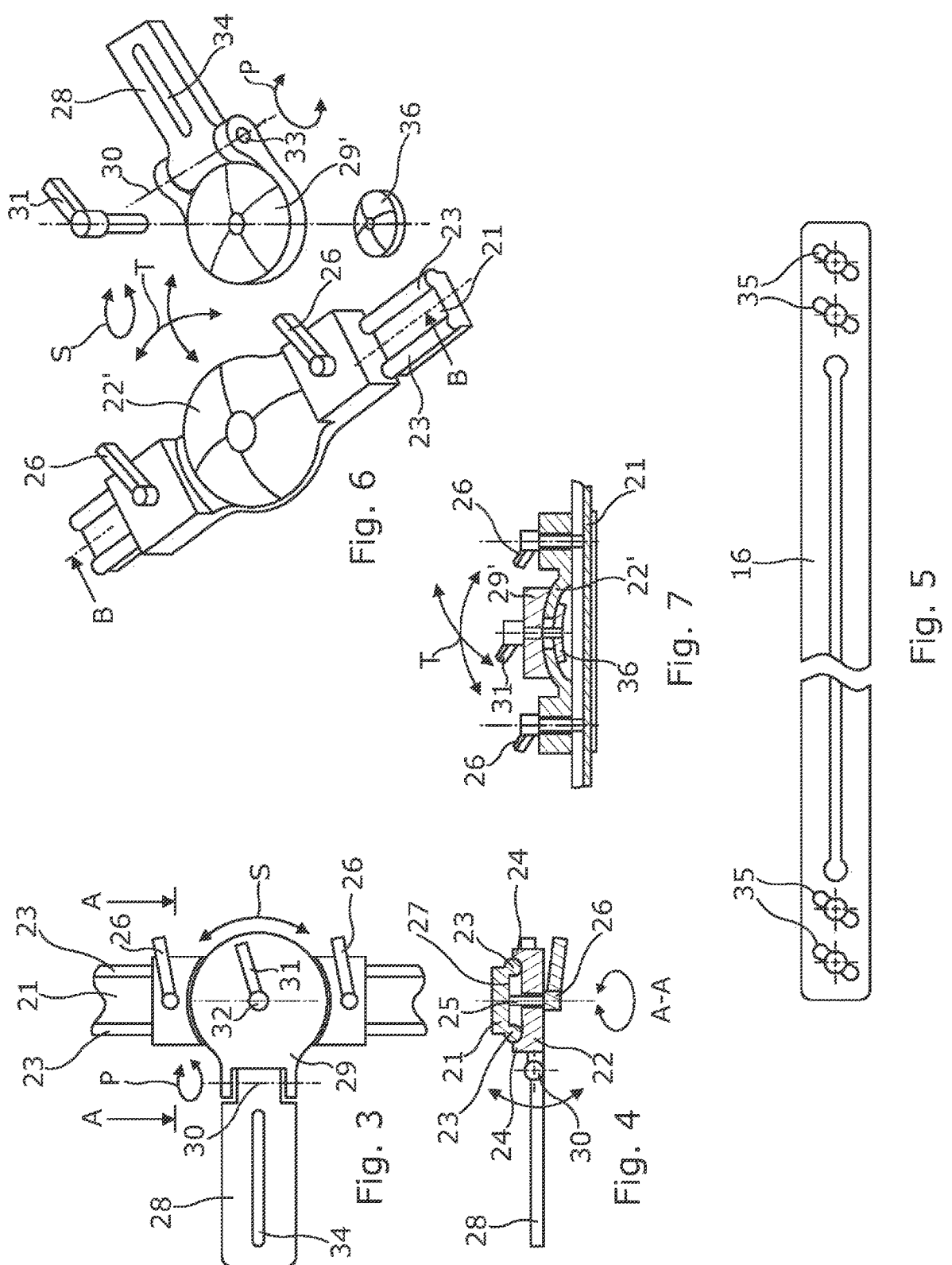

FIG. 1 shows a diagrammatic side view of a tractor cab fitted with a mounting system for a display device;

FIG. 2 shows a diagrammatic plan view of a right-hand portion of the above cab with the mounting device positioned across a right-hand window;

FIG. 3 shows a plan view of a suitable form of clamp for use in the mounting system;

FIG. 4 shows a section on the line A-A of FIG. 3;

FIG. 5 shows a view of part of a typical first support element;

FIG. 6 shows an exploded perspective view of an alternative form of clamp which could be used to provide increased adjustability of the angles of the first and/or second support elements;

FIG. 7 shows a section on the line B-B of FIG. 6;

Figures 8, 9, 10, 11:
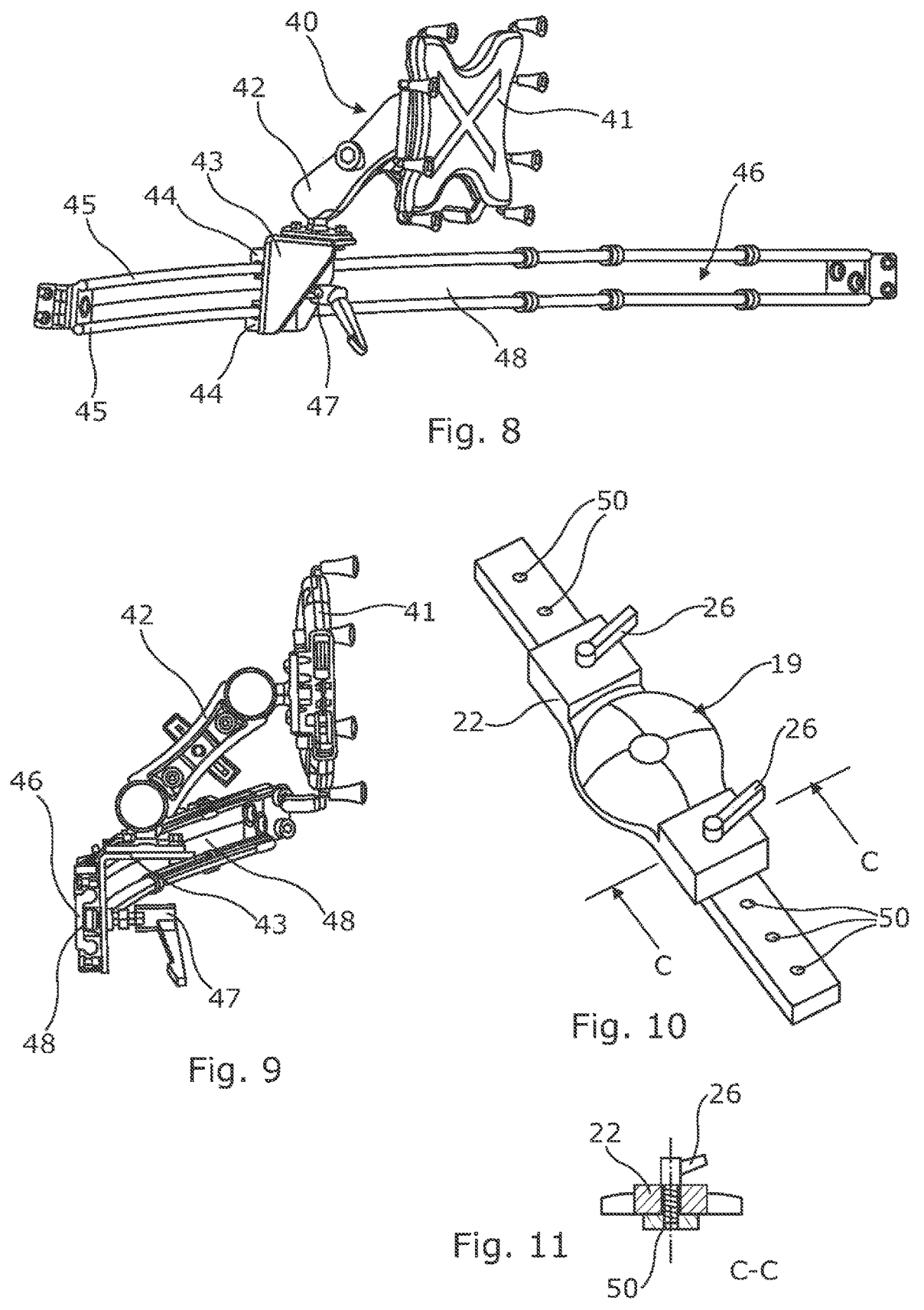

FIGS. 8 and 9 show perspective views of one form of mounting bracket;

FIG. 10 shows one form of fastener for the support elements which does not use tracks to clamp the fastener to, and FIG. 11 shows a section on the line C-C of FIG. 10.

DETAILED DESCRIPTION

FIGS. 1 and 2 show diagrammatic representations of a tractor cab 10, which has four corner posts or pillars 11 supporting a roof structure 12 above a cab floor 13. In other embodiments, the cab may have more than four pillars supporting the roof structure.

A mounting system 14 for a display device or other device 15 has a first generally horizontally extending support element 16 designed to extend between two of the pillars 11 and a second generally vertically extending support element 17 which is designed to extend between the roof structure 12 and a mid-portion of the first support element 16.

In the example shown, the pillars 11 each have a track 18 secured to their inwardly facing surface to which first fasteners in the form of clamps 19 on the ends of the first support element 16 can be secured. Similarly, the second support element 17 has second fasteners in the form of clamps 20a, 20b on its upper and lower ends, which can be respectively secured to a track 21 secured to the roof structure and to a track 16a secured the first support element 16 (See FIG. 2).

As can be seen from detail 1A of FIG. 1, the track 21 can be orientated vertically or horizontally on the roof structure, but extends lengthways in a direction between the pillars 11 to which the first support element 16 is mounted.

Details of one form of fastener suitable for use as clamps 19, 20a and 20b are shown in FIGS. 3 and 4. The fastener or clamp 19, 20a and 20b has a main body 22 which slides along track 16a, 18, or 21 which has raised rails 23 extending its edges. The body has flanges 24 which engage and extend behind rails 23 and can be held in a fixed position on the track by tightening a first clamping arrangement or system in the form of clamping screws 26 to bring the ends 25 of the screws into contact with the base 27 of the track.

An arm 28 which is mounted on a swivel plate 29 via a pin 33 (see FIG. 2) for pivoting about an axis 30 as indicated by arrow P (see FIG. 3). The swivel plate 29 is in turn mounted on the body 22 by second clamping arrangement or system in the form of a clamping screw 31 so that the angle of the arm 28 relative to body 22 can pivot about axis 32 of screw 31 as indicated by arrow S.

The arm 28 has a slot 34 through which the arm can be attached to the support element 16, 17 by winged screws 35 (see FIGS. 2 and 5). The first support element 16 is provided with a clamp 19 at either end for engagement with respective pillars 11 as shown in FIGS. 1 and 2.

As shown diagrammatically in FIG. 1, the lower end of the generally vertical support element 17 is secured to the mid-portion of the first element 16 by clamp 20b, which can be of the same form as clamp 19 described above with the first element having its track 16a orientated on its edge with the track rails 23 one above the other.

As will be appreciated, the effective length of the first and second support elements can be adjusted using the position of the winged screws 35 in the slots 34 of the arms 28 to fit a range of cabs. Also, the length of the first and second support elements can be used to force the clamps towards their respective tracks 16a, 18, or 21 to assist in maintaining the clamps in contact with their tracks. The first and second support elements 16, 17 can also be telescopic to further assist in making the mounting system more versatile in fitting a range of different tractor cabs.

Also, if necessary, due to cab geometry such as curved pillars, the clamps 19 can be modified as shown in FIGS. 6 and 7, in which the swivel plate 29', a cooperating portion 22' of the main body of the clamp, and a clamping nut 36 are all domed to allow further freedom of movement of the arm 28 relative to the body 22 of the clamp as indicated by arrow T.

The display device 15 can be mounted on either of the first or second support elements 16 and 17 of the mounting system by a suitable mounting bracket or clip arrangement 15a, also referred to as an attachment apparatus. One suitable mounting bracket is shown in FIGS. 8 and 9, in which bracket 40 has a support plate 41 for direct support of the display device and which is in turn supported by an articulated arm 42. The articulated arm 42 has a clamp 43 at the end opposite the support plate 41 for mounting to a support element 16, 17. The clamp 43 may have flanges 44 that engage rails 45 of a track 46 on the support element 16, 17. The clamp is secured in position on the track by a clamping screw 47, which engages the base 48 of the track 46 in a manner similar to that as previously described with reference to the clamping screw 26 of FIGS. 3 and 4. A track 46 for the mounting bracket 40 can be provided on either or both of the support elements 16, 17. Where the mounting bracket 40 is mounted to the first support element 16, the clamp 43 can be mounted to the track 16a on the first support element 16, which takes the place of the track 46.

Although the tracks 16a, 18, 21, 46 are described above as separate components which are mounted on the pillars, roof structure, or support elements, these tracks could be formed integrally with pillars, roof structure, or support elements.

The use of tracks might be avoided completely by, for example, providing spaced threaded apertures 50 along the pillars, roof structure, or other parts of the cab into which clamping screws 26 can be screwed to secure the main bodies 22 of clamps 19 in the required positions as shown in FIGS. 10 and 11.

If necessary, the first support element 16 can be inclined significantly relative to the horizontal, and the mounting system of the present invention provides a great deal of freedom in the positioning of the mounted display device or similar device.

Also, although the embodiment described in detail above has only one horizontal first support element 16 and one vertical second support element 17 secured to the mid-portion of the first element, other configurations include more than one first and/or second support element. For example, several vertical second support elements might support one horizontal support element, or two first support elements might be joined end to end with a vertical second support element supporting the first support elements at their junction. These more complex configurations enable the mounting system to support more weight. Furthermore, though embodiments of the invention are described for use in a cab of an agricultural tractor, the mounting system can be adapted for use in other utility vehicles having a similar cab structure including, without limitation: other agricultural vehicles, construction vehicles such as diggers, excavators, or the like, and mobile machines.

What is claimed is:

1. A mounting system for mounting a device inside a cab of a utility vehicle, where the cab has a plurality of vertically extending pillars supporting a cab roof structure, the mounting system comprising:

at least one first support element configured to extend between, and be coupled to, two of the pillars;

at least one second support element configured to extend from the roof structure and be coupled to the at least one first element to support the at least one first element in position between the pillars wherein ends of the first and second support elements each have a fastener for securing the ends of the support elements to at least one structure selected from the group consisting of the pillars, the roof structure, and another of the first and second support elements, wherein at least one of the fasteners comprises a pivot to enable variation of an angle of a respective support element relative to the component to which it is secured; and attachment apparatus carried on at least one of the support elements and configured for supporting the device.

2. The mounting system of claim 1, wherein the device is a display device.

3. The mounting system of claim 1, wherein the at least one first support comprises only a single first support element configured to extend between two of the pillars, and wherein the at least one second support element comprises only a single second support element configured to extend between the roof structure and the first support element.

4. A utility vehicle having an operator's cab having a plurality of vertically extending pillars supporting a cab roof structure and a mounting system for mounting a device inside the cab, the mounting system comprising:

at least one first support element configured to extend between, and be coupled to, two of the pillars;

at least one second support element configured to extend from the roof structure and be coupled to the at least one first element to support the at least one first element in position between the pillars, wherein the second support element is elongate having opposed ends, an uppermost end of the second support element being mounted to an elongate member of the roof structure extending in a direction between the pillars to which the first support element is mounted, and wherein a lower end of the second support element is attached to the first support element, and wherein a connection between the lower end and the first support element is configured to allow the position of the lower end to be adjusted in a lengthwise direction of the first support element; and attachment apparatus carried on at least one of the support elements and configured for supporting the device.

5. The mounting system of claim 1, wherein at least one fastener on the at least one first support element is configured to directly engage an inwardly facing surface on an associated pillar or a track mounted thereon.

US 12,606,102 B2

7

6. The mounting system of claim 1, wherein a fastener on an upper end of the at least one second support element is configured to engage the roof structure or a track mounted thereon.

7. The mounting system of claim 1, wherein a fastener on a lower end of the at least one second support element is configured to engage the at least one first support element or a track mounted thereon.

8. A mounting system for mounting a device inside a cab of a utility vehicle, where the cab has a plurality of vertically extending pillars supporting a cab roof structure, the mounting system comprising:

at least one first support element configured to extend between, and be coupled to, two of the pillars;

at least one second support element configured to extend from the roof structure and be coupled to the at least one first element to support the at least one first element in position between the pillars; and attachment apparatus carried on at least one of the support elements and configured for supporting the device;

wherein ends of the first and second support elements each have a fastener for securing the ends of the support elements to at least one structure selected from the group consisting of the pillars, the roof structure, and another of the first and second support elements;

wherein at least one fastener comprises:

a main body configured to engage an associated track on a pillar, roof structure, or connected support element;

a first clamping system configured for clamping the main body to the associated track in a selected operating position;

an arm mounted for pivoting about a first axis on the main body and secured to an end of an associated support element; and a second clamping system configured for clamping the arm in a set pivoted position about the first axis relative to the main body.

9. The mounting system of claim 8, wherein the arm is mounted on the main body of the fastener via a domed swivel plate configured to slide over and be clamped against a domed portion of the main body by the second clamping system to provide further freedom of movement of the arm relative to the main body.

10. The mounting system of claim 8, wherein the arm has a slot through which the fastener is attached to the associated support element to enable an effective length of the associated support element to be varied.

11. The mounting system of claim 8, wherein the arm is pivotable relative to the main body about a second axis perpendicular to the first axis.

12. The utility vehicle of claim 4, wherein a length of at least one of the first and second support elements is adjustable.

13. The utility vehicle of claim 4 wherein the device is a display device.

14. A utility vehicle having an operator's cab having a plurality of vertically extending pillars supporting a cab roof structure and the mounting system of claim 1.

15. The utility vehicle of claim 14, wherein the first support element is elongate having opposed ends, each end of the first support element being mounted to a respective one of the pillars to enable the position of the end of the first support element to be adjusted in a lengthwise direction of the pillar.

16. The utility vehicle of claim 14, wherein the second support element is elongate having opposed ends, an uppermost end of the second support element being mounted to an elongate member of the roof structure extending in a direction between the pillars to which the first support element is mounted.

17. The utility vehicle of claim 16, wherein a connection between the uppermost end and the elongate member is configured to allow the position of the uppermost end to be adjusted in a lengthwise direction of the elongate member.

18. The utility vehicle of claim 4, wherein ends of the first and second support elements each have a fastener for securing the ends of the support elements to at least one structure selected from the group consisting of the pillars, the roof structure, and another of the first and second support elements.

19. The utility vehicle of claim 18, wherein at least one of the support elements is telescopic.

20. The utility vehicle of claim 18, wherein at least one of the fastener comprises clamping screws configured to engage threaded apertures in an associated pillar or the roof structure.

* * * * *